United States Patent [19]

Houdeau et al.

[11] Patent Number: 5,896,111
[45] Date of Patent: Apr. 20, 1999

[54] ANTENNA COIL

[75] Inventors: Detlef Houdeau, Langquaid; Lothar Kiesewetter, Berlin; Josef Mundigl, Duggendorf, all of Germany

[73] Assignee: Siemens Aktiengesellschaft, Munich, Germany

[21] Appl. No.: 08/811,502

[22] Filed: Mar. 5, 1997

Related U.S. Application Data

[63] Continuation of application No. PCT/DE01/01197, Sep. 5, 1995.

[30] Foreign Application Priority Data

Sep. 5, 1994 [DE] Germany ............... 44 31 603

[51] Int. Cl.$^6$ .................................... H01Q 21/00
[52] U.S. Cl. ............... 343/867; 343/895; 343/897
[58] Field of Search .................... 343/713, 897, 343/867, 868, 702, 741, 742, 895; H01Q 21/00

[56] References Cited

U.S. PATENT DOCUMENTS

| | | | |
|---|---|---|---|
| 1,640,929 | 8/1927 | Farkouh | 343/897 |
| 1,689,337 | 10/1928 | Haddock | 343/897 |
| 3,414,902 | 12/1968 | Shaw | 343/713 |
| 4,987,424 | 1/1991 | Tamura et al. | 343/806 |

FOREIGN PATENT DOCUMENTS

| | | |
|---|---|---|
| 906 831 | 3/1954 | Germany . |
| 29 12 341 | 10/1979 | Germany . |
| 31 48 192 A1 | 6/1983 | Germany . |
| 34 4 1 670 A1 | 5/1986 | Germany . |
| 39 27 181 A1 | 3/1990 | Germany . |
| 40 24 507 A1 | 2/1992 | Germany . |
| 91 15 582 | 2/1993 | Germany . |

OTHER PUBLICATIONS

Patent Abstracts of Japan No. 60057703 (Yoshikazu), dated Apr. 3, 1985.
Patent Abstracts of Japan No. 57186802 (Tadayoshi), dated Nov. 17, 1982.

*Primary Examiner*—Don Wong
*Assistant Examiner*—Tho Phan
*Attorney, Agent, or Firm*—Herbert L. Lerner; Laurence A. Greenberg

[57] ABSTRACT

An antenna coil, in particular for a contactless smart card, includes coil turns formed of thin conductor tracks having first and second ends. The first end of a respective one of the conductor tracks is electrically conductively connected to the second end of an adjacent one of the conductor tracks. The conductor tracks include first and last conductor tracks, and the first end of the first conductor track and the second end of the last conductor track form coil connections. The conductor tracks are disposed in parallel on a flexible, non-conductive carrier strip. The carrier strip has bends and forms a polygon containing the connected ends of the conductor tracks. The bends are guided through approximately 180°, and the coil turns lie approximately in the same plane.

5 Claims, 3 Drawing Sheets

1

ANTENNA COIL

CROSS-REFERENCE TO RELATED APPLICATION

This application is a Continuation of International Application Ser. No. PCT/DE95/01197, filed Sep. 5, 1995.

BACKGROUND OF THE INVENTION

Field of the Invention

The invention relates to an antenna coil, in particular for a contactless smart card, having coil turns formed by thin conductor tracks disposed in parallel on a flexible, non-conductive carrier strip in such a way that a first end of a respective conductor track is electrically conductively connected to a second end of an adjacent conductor track, and the first end of a first conductor track and the second end of a last conductor track form coil connections.

In the case of contactless smart cards, the power for supplying the semiconductor chip and the data transmitted from and to the chip are conveyed through at least one antenna coil which is disposed on or in the smart card.

Previous concepts for producing such antenna coils envisaged winding the latter from enamel-insulated copper wire. It has also been proposed to apply the antenna coils (as planar coils) directly to the plastic body of the smart card, for example through the use of thick-film technology.

The publications "Patent Abstracts of Japan, Vol. 7, No. 33 (E-157), Feb. 9, 1983 & Japanese Patent Application No. 57186802 (KOUON DENPA), Nov. 17, 1982" and "Patent Abstracts of Japan, Vol. 9, No. 189 (E-333), Aug. 6, 1985 & Japanese Patent Application No. 60057703 (MATSUSHITA), Apr. 3, 1985" disclose antenna coils having turns formed by thin conductor tracks, which are disposed in parallel on a flexible, non-conductive carrier strip, in such a way that the first end of a respective conductor track is electrically conductively connected to the second end of a neighboring conductor track, and the first end of the first conductor track and the second end of the last conductor track form coil connections.

In that case, however, the bends of the conductor tracks are made in such a way that the conductor tracks run, before and after a bend, in planes which are oriented at an angle of about 90° to one another, thereby producing a three-dimensional structure. Such an antenna coil could not be incorporated into a smart card, which must, after all, only have a thickness of less than 1 mm.

SUMMARY OF THE INVENTION

It is accordingly an object of the invention to provide an antenna coil, which overcomes the hereinafore-mentioned disadvantages of the heretofore-known devices of this general type, which can be produced simply, cost-effectively and in a manner that can be easily automated, and which at the same time is easy to handle in conjunction with a semiconductor chip and has a small height when installed.

With the foregoing and other objects in view there is provided, in accordance with the invention, an antenna coil, in particular for a contactless smart card, comprising coil turns formed of thin conductor tracks having first and second ends, the first end of a respective one of the conductor tracks being electrically conductively connected to the second end of an adjacent one of the conductor tracks, the conductor tracks including first and last conductor tracks, and the first end of the first conductor track and the second end of the last conductor track forming coil connections; and a flexible, non-conductive carrier strip on which the conductor tracks are disposed in parallel, the carrier strip having bends and forming a polygon containing the connected ends of the conductor tracks, the bends being guided or routed through approximately 180°, and the antenna turns lying approximately in the same plane.

In accordance with another feature of the invention, the conductor tracks are embedded in the carrier strip.

In accordance with a further feature of the invention, the conductor tracks have an approximately rectangular cross-section.

In accordance with an added feature of the invention, there is provided a flat, non-conductive carrier body on which the carrier strip is disposed.

A particular advantage of the antenna coil according to the invention is that it can be produced from carrier strips, such as, for example, MYLAR (produced by Dupont) flat striplines, which are freely available commercially and are provided with conductor tracks. Those carrier strips only have to be tailored to the correct length and width and be shaped to form, preferably, a rectangular coil. However, other types of polygons are also possible, of course, for example a triangle.

In this case, the shaping is effected in such a way that a section of the carrier strip is bent at an angle of approximately 180° with respect to another section, with the two sections coming to lie essentially in one plane. This bending is carried out until the two ends of the carrier strip are opposite one another or come to lie on one another. The insulation is stripped from the ends of the strips and the conductor track ends that are then exposed are, for example, tin-coated and soldered to one another. In this case, the second end of the first conductor track is connected to the first end of the second conductor track, the second end of which is connected to the first end of the third conductor track, etc. Only the first end of the first conductor track and the second end of the last conductor track remain free, and they are used as connections of the antenna coil.

This procedure can easily be automated and thus results in readily reproducible coil values, such as their quality, for example. Since the carrier strip has a certain fundamental rigidity in spite of its flexibility, the finished antenna coil with the semiconductor chip fitted thereto is easy to handle, that is to say is easy to transport and incorporate into a smart card.

In accordance with a concomitant feature of the invention, during the shaping of the antenna coil, the carrier strip is routed around the beveled corners of a flat carrier body, with the result that even better handling is made possible.

Other features which are considered as characteristic for the invention are set forth in the appended claims.

Although the invention is illustrated and described herein as embodied in an antenna coil, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
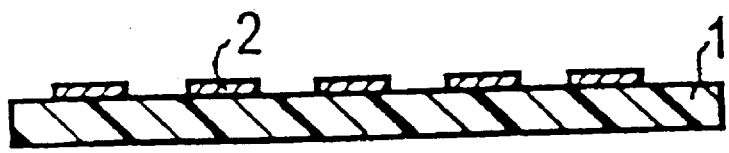
FIGS. 1 to 3 are diagrammatic, cross-sectional views of possible embodiments of carrier strips provided with conductor tracks according to the invention.
Figure 2:
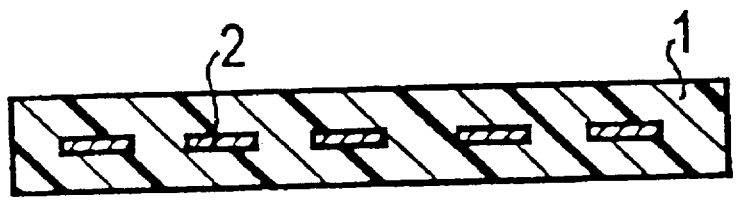
Figure 3:
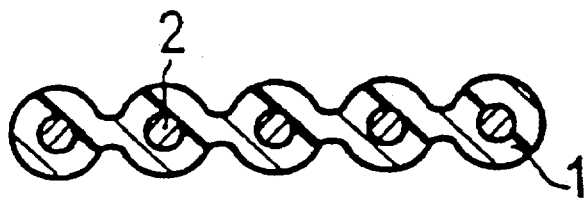

Referring now to the figures of the drawings in detail and first, particularly, to FIG. 1 thereof, there is seen a cross-section through a first possible embodiment of a flexible, non-conductive carrier strip 1 with conductor tracks 2 applied hereon. MYLAR polyester film can be used, for example, as the material for the carrier strip 1. The conductor tracks 2 are applied onto this base material through the use of printing technology. FIGS. 2 and 3 show further embodiments of carrier strips 1, but in those embodiments the conductor tracks 2 are embedded in the carrier strips 1. In FIG. 2, the conductor tracks 2 have a rectangular cross-section, just as in FIG. 1, whereas the conductor tracks 2 have a round cross-section in FIG. 3.

Figure 4:
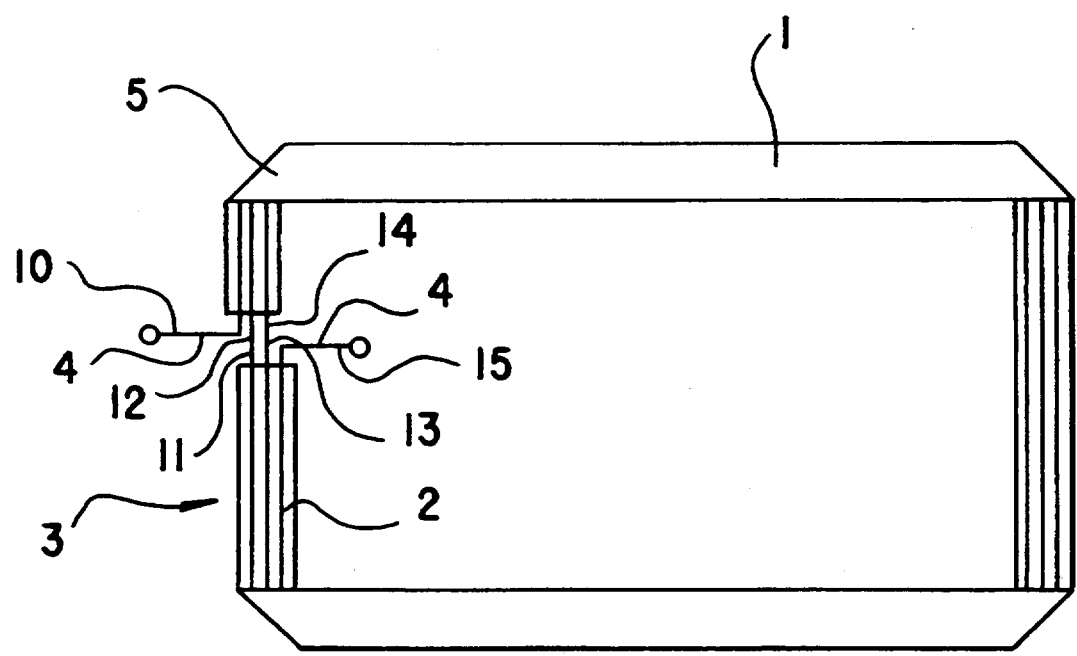
FIG. 4 is a view of an antenna coil shaped by bends.

FIG. 4 illustrates an antenna coil 3 which is completely formed or shaped. The carrier strip 1 is provided with four bends 5, with the result that respective sections of the carrier strip run approximately at right angles to one another in approximately the same plane. Ends of the conductor tracks 2 are stripped of insulation and connected to one another in such a way that a second end 11 of a first conductor track is connected to a first end 12 of a second conductor track and a second end 13 of the second conductor track is connected to a first end 14 of a third conductor track. A first end 10 of the first conductor track and a second end 15 of the third and last conductor track form connections 4 of the antenna coil 3.

Figure 5:
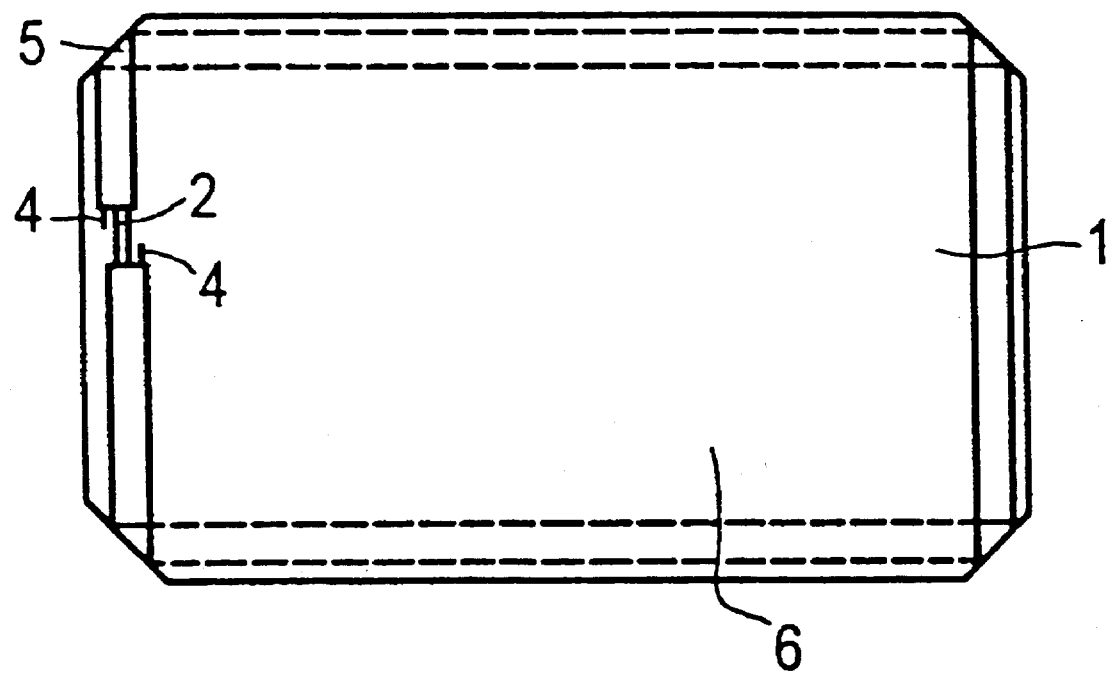
FIG. 5 is a view of an antenna coil wound around a flat carrier body.

FIG. 5 likewise shows an antenna coil according to the invention, but in this case the bends 5 are routed around beveled corners of a carrier body 6. In this case, the carrier strip 1 runs on both surfaces of the carrier body 6.

We claim:

1. An antenna coil, comprising:

coil turns formed of thin conductor tracks having first and second ends, said first end of a respective one of said conductor tracks being electrically conductively connected to said second end of an adjacent one of said conductor tracks, said conductor tracks including first and last conductor tracks, and said first end of said first conductor track and said second end of said last conductor track forming coil connections; and a flexible, non-conductive carrier strip on which said conductor tracks are disposed in parallel, said carrier strip having bends and forming a polygon containing said connected ends of said conductor tracks, said bends being guided through approximately 180°, and said coil turns lying approximately in the same plane.

2. The antenna coil according to claim 1, wherein said conductor tracks are embedded in said carrier strip.

3. The antenna coil according to claim 1, wherein said conductor tracks have an approximately rectangular cross-section.

4. The antenna coil according to claim 1, including a flat, non-conductive carrier body on which said carrier strip is disposed.

5. The antenna coil according to claim 1, including a substantially rectangular, flat carrier body having beveled corners around which said bends of said carrier strip are guided.

* * * * *

UNITED STATES PATENT AND TRADEMARK OFFICE
CERTIFICATE OF CORRECTION

PATENT NO. : 5,896,111
DATED : April 20, 1999
INVENTOR(S) : Detlef Houdeau et al.

It is certified that error appears in the above-indentified patent and that said Letters Patent is hereby corrected as shown below:

On the title page,

Item [63] should read as follows:

Continuation of PCT/DE95/01197, September 5, 1995

Signed and Sealed this

Twenty-third Day of November, 1999

Attest:

Q. TODD DICKINSON

*Attesting Officer*    *Acting Commissioner of Patents and Trademarks*